United States Patent
Bishop (10) Patent No.: US 8,585,529 B2
(45) Date of Patent: Nov. 19, 2013

(54) POSITIVE DRIVE INFINITELY VARIABLE TRANSMISSION

(76) Inventor: Wayne Paul Bishop, Wilmington, DE (US)

( * ) Notice: Subject to any disclaimer, the term of this patent is extended or adjusted under 35 U.S.C. 154(b) by 330 days.

(21) Appl. No.: 13/016,963

(22) Filed: Jan. 29, 2011

(65) Prior Publication Data

US 2011/0190093 A1 Aug. 4, 2011

Related U.S. Application Data (60) Provisional application No. 61/299,499, filed on Jan. 29, 2010.

(51) Int. Cl.
*F16H 37/02* (2006.01)
*F16H 63/00* (2006.01)

(52) U.S. Cl.
USPC .......................................... 475/210; 474/83

(58) Field of Classification Search
USPC ......... 475/207, 210; 74/348, 349; 474/54, 83, 474/89, 78, 71
See application file for complete search history.

(56) References Cited

U.S. PATENT DOCUMENTS

| 757,751 | A | * | 4/1904 | Kessler | 474/83 |
|---|---|---|---|---|---|
| 3,648,543 | A | * | 3/1972 | Fragnito | 475/212 |
| 4,056,987 | A | * | 11/1977 | Hoffmann | 474/23 |
| 4,136,851 | A | * | 1/1979 | Hansen et al. | 251/63 |
| 5,055,094 | A | * | 10/1991 | Cataldo | 475/211 |
| 5,425,685 | A | * | 6/1995 | Park | 476/55 |
| 6,421,903 | B2 | * | 7/2002 | Brown | 29/428 |
| 7,887,452 | B2 | * | 2/2011 | Kurihara | 475/211 |
| 2006/0148609 | A1 | * | 7/2006 | Roethler et al. | 475/207 |

* cited by examiner

*Primary Examiner* — Roger Pang
(74) *Attorney, Agent, or Firm* — Law Offices of Jeffrey R. Ramberg (57) ABSTRACT

The "Forced Way" method is a unique method of generating variable ratio outputs from a given input of constant rotational speed by forcing one end of a drive shaft to follow a continuous path (way) around a given circle at a constant speed that can then be deformed into curves of varying radiuses that would range from the radius of the given circle to that of the various radiuses (arcs) of various ovals to a final shape of an oblong. Forcing the end of the drive shaft to follow these shapes would result in the drive shaft rotating at different rotational speeds as it transverses the shape. By sampling only the rotational output while moving over the desired portion of the shape one can control the output's rotational speed which will be some ratio of the input. The "Forced Way" method is the only method of continuously varying an output that is robust enough to be used in any vehicle with NO possibility of slipping.

19 Claims, 2 Drawing Sheets

POSITIVE DRIVE INFINITELY VARIABLE TRANSMISSION

CROSS-REFERENCE TO RELATED APPLICATIONS

This patent document claims the benefit of commonly owned U.S. Provisional Patent Application Ser. No. 61/299,499, filed on Jan. 29, 2010 in the name of Wayne Paul Bishop. The entire contents of this provisional patent application are expressly incorporated herein by reference.

STATEMENT REGARDING FEDERALLY SPONSORED RESEARCH

None.

BACKGROUND OF THE INVENTION

1. Field of the Invention

This invention relates to power transmissions for powered vehicles, in particular trucks and automobiles, but also for any type of machinery that would require variable speed control of the driven component. In addiction, the invention relates to a transmission in which the output can be infinitely varied ranging from a low negative rotational speed (reverse), through a 0 rotational speed, to a final rotational speed that is engineered to be a given portion (ratio) of the input's rotational speed and in which the output is directly mechanically, i.e. non-frictionally, connected to the input and can not slip.

2. Description of Related Art

Infinitely variable transmissions were developed in order to optimize the efficiency and performance of the power source being used and in particular the Internal Combustion engine (ICE). However, attempts to find (develop) an infinitely variable transmission that could deliver a continuously variable output that would be positively, i.e., directly, connected to the input and also be feasible for use in today's trucks and automobiles has eluded engineers and inventors to this day.

The only "positively driven" infinitely variable transmission methods that exist today use ratchets, cams, pins, variable sprockets and many other forms of engagement that have not been found to be feasible because they are either too expensive to manufacture, too noisy, have too much vibration, wear out prematurely or too costly to maintain and, most importantly, can not handle high torque and/or high speed. Therefore engineers and inventors HAD NO CHOICE but to resort to the high pressure "friction driven" method. From the beginning this "friction driven" method had problems with slipping under a heavy torque load which meant they could only be used in the smaller, lighter weight vehicles. Later developments in special (expensive) lubricants would increase the friction at the point of contact of the driving and driven components allowing for much higher torque handling before slipping and therefore could be used in much larger vehicles.

There are various types of "friction driven" transmissions like toroidal and steel belt with variable pulleys but all require the use of very high pressures, some requiring hydraulic systems, highly precision made parts and require expensive specially designed lubricants.

The problem is that there is a great need for a positively driven (non-friction driven) infinitely variable transmission that is robust enough to handle high torque without slipping, able to operate at high speeds and can meet all the criteria for feasibility for use in today's trucks and automobiles as previously mentioned. What is desired is to be able to smoothly and continuously (no stepping or pulsing etc.) vary the output rotational speed (RPM—Revolutions Per Minute) of an input power source of a given RPM such that the output's RPM will range from 0 RPM to some desired final RPM (a percentage of the given input RPM). The desired function must also be mechanically directly connected at all times with no possibility of slipping. The present invention, the "Forced Way method", addresses and solves all those problems.

SUMMARY OF THE INVENTION

The "Forced Way" method is a method of generating variable ratio outputs from a given input of constant rotational speed. According to the method, one end of a shaft is forced to follow a continuous path (way) around a given circle at a constant speed. The path is defined by a rotatable and deformable structure. The deformable structure may be deformed by deforming a surrounding stationary structure called a "way". After one complete circuit, the shaft has rotated by one revolution. The path may start out as a circle, but it can be controllably deformed into curves of varying radii that would range from the radius of the given circle to that of the various radii (arcs) of various ovals to a shape of an oblong, where a portion of the path has an infinitely large radius, i.e., is a straight line segment. Forcing the end of the shaft to follow these paths results in the shaft rotating at different rotational speeds as it transverses the path. By sampling only the rotational output while moving over the desired portion or segment of the path, one can control the output's rotational speed which will be some ratio of the input. The path may even be shaped as a "dogbone" in which a portion of the path has a negative radius, thereby providing an output that is in a direction that is the reverse of the direction resulting from a positive radius for the path segment.

DETAILED DESCRIPTION OF THE DRAWINGS

Figure 1:
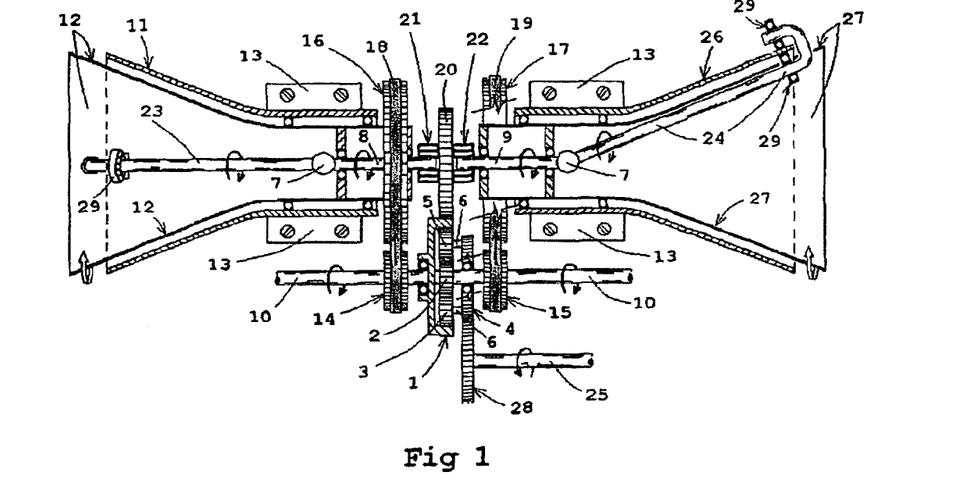
FIG. 1 is a top view showing all components of a "cone" Way/"cone" Drive type PDIVT (Positive Drive Infinitely Variable Transmission) including final output delivery components.

FIG. 1 is a top view showing all components of a "cone" Way/"cone" Drive type PDIVT (Positive Drive Infinitely Variable Transmission), including final output delivery components Output Gear 28, and Output Shaft 15. It shows sectional views of Drive Cone 12 and 27, Way Cone 11 and 26, Ring Gear 1, and Overrun Clutch 21 and 22 to show inner workings and positioning of components. It shows open section of Cone Drive Pulley 17 to show that Cone Drive Pulley 17 and 16 are affixed to Drive Cones 27 and 12, respectively. It also shows open view of Carrier Gear 4 to show is supported by Input Shaft 10 with bearing and is free to rotate around Input Shaft 10. All components only rotate or move in the direction shown by the arrows. Way Cone Mounting Brackets 13 are screwed to a base and are also affixed to Way Cones 11 and 26 to show that Way Cones 11 and 16 are stationary and do not move except for changing their shape. All drawings that look like Way Follower Bearing 29 are also bearings used for near frictionless contact. NOTE: FIG. 1 does not show bearings and counter weighting elements that will be necessary on Drive Cones 12 and 27 in order that Drive Cones 12 and 27 may rotate within Way Cones 11 and 26 with the least resistance and vibration.

Figure 2:
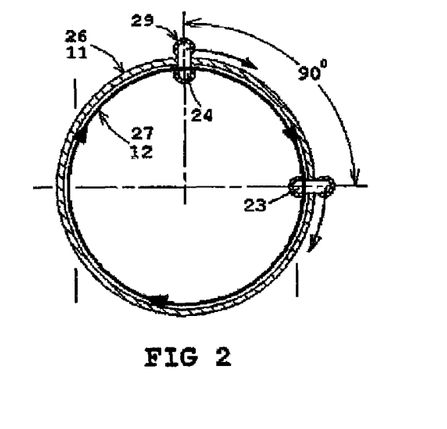
FIG. 2 is a right side view of FIG. 1 showing a few components to indicate positioning and direction of movement of components.

FIG. 2 is a right side view of FIG. 1 showing Way Cone 26, Drive Cone 27, and Way Follower Shaft 24. Their counterparts Way Cone 11, Drive Cone 12, and Way Follower Shaft 23 are really on the opposite side (See FIG. 1) but are also indicated here in order to show relation positions and directions of travel. This drawing shows Way Follower Shaft 23, which is on the opposite side, follows its Way (path) in the same rotational direction as Way Follower Shaft 24 but leads Follower shaft 24 by 90 degrees. Way Follower Bearings 29 are roller bearings on Way Follower Shafts 23 and 24 (See FIG. I) that provide a near frictionless contact at the top and bottom surface of Way Cones 11 and 26 so that Way Follower Shafts 23 and 24 may be forced to fellow Way Cones 11 and 26's shape with the least amount of fictional resistance. NOTE: FIG. 2 does not show bearings and counter weighting elements that will be necessary on Drive Cones 12 and 27 in order that Drive Cones 12 and 27 may rotate within Way Cones 11 and 26 with the least resistance and vibration.

Figure 3:
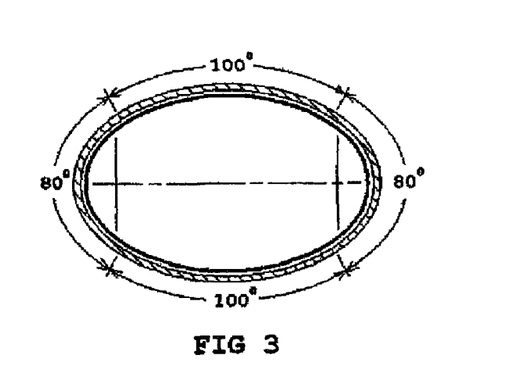
FIG. 3 is a side view of FIG. 1 showing one of various ellipse shapes possible and degrees of segments which can be referred to later.
Figure 4:
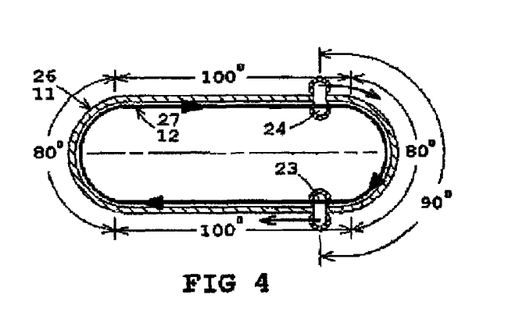
FIG. 4 is a side view of FIG. 1 showing a few components to indicate positioning and direction of movement during the oblong shape configuration.

FIG. 3 shows an approximate halfway point in the deformation of Way Cones 11 and 26 and Drive Cones 12 and 27, with FIG. 2 being a beginning shape and FIG. 4 being the ending shape. FIG. 3 also shows, in degrees, the segments along the circumference of the ellipse at which the radiuses of arc are approximately equal and at what points they abruptly change. The 100° segments of the ellipse have a greater radius of arc (less curve) and the 80° segments have a smaller radius of arc (tighter curve).

FIG. 4 is a right side view of FIG. 1 showing Way Cone 26, Drive Cone 27, and Way Follower Shaft 24 but only after Way Cone 26, Drive Cone 27 and their counterparts Way Cone 11, Drive Cone 12 have been deformed into an oblong shape. Their counterparts Way Cone 11, Drive Cone 12, and Way Follower shaft 23 are really on the opposite side (See FIG. 1) but are also included here in order to show relation positions and directions of travel. This drawing shows Way Follower Shaft 23. which is on the opposite side, follows its Way (path) in the same rotational direction as Way Follower Shaft 24 but leads Way Follower Shaft 24 by 90 degrees. Leading by 90° insures that Way Follower Shaft 23 will enter the next (bottom) 100° segment before Way Follower Shaft 24 leaves the lasts (top) 100° segment (as shown in FIG. 4) and also insures that Way Follower shaft 24 will enter that (bottom) 100° segment prior to Way Follower Shaft 23 leaving that (bottom) 100° segment. Way Follower Bearings 29 are roller bearings on Way Follower Shafts 23 and 24 (See FIG. 1) that provide a near frictionless contact at the top and bottom surface of Way Cones 11 and 26 so that Way Follower Shafts 23 and 24 may be forced to follow Way Cones 11 and 26's shape with the least amount of fictional resistance. NOTE: FIG. 4 does not show bearings and counter weighting elements that will be necessary on Drive Cones 12 and 27 in order that Drive Cones 12 and 27 may rotate within Way Cones 11 and 26 with the least resistance and vibration.

Figure 5:
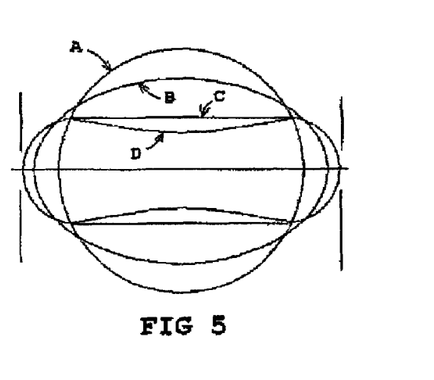
FIG. 5 shows various, but not all, shapes (paths) that components could follow.

FIG. 5 shows various, but not all, shapes (paths) components could follow. Shape A is that of a circle, and shape B is one example of the ellipse shapes formed by deforming the circle gradually until it reaches the oblong shape which is that of shape C. Shape D shows a shape resulting from deforming the straight portion of the oblong shape further towards its center and therefore creating a path (Way) with a negative or reverse curve.

DETAILED DESCRIPTION OF THE INVENTION

The desired function is to be able to smoothly and continuously (no stepping or pulsing etc.) vary the output rotational speed (RPM—Revolutions Per Minute) of an input power source of a given RPM such that the output's RPM will range from 0 RPM to some desired final RPM (a percentage of the given input RPM). The desired function must also be mechanically directly connected at all times with no possibility of slipping.

Note: This desired function can be achieved by utilizing a method (concept) I call the "Forced Way" method. The "Forced Way" method can be utilized to "directly" develop the final varied output or as a variable "control" in developing the final varied output. The PDIVT (Positive Drive Infinitely Variable Transmission) embodiment described below utilizes the Forced Way method as a variable "control" in order to achieve the desired function.

My invention is a completely new and unique "method" of varying input to output ratios. The Forced Way method is the first and only method in which a given input RPM (revolutions per minute) can be infinitely varied to produce an output ranging from a slow negative RPM to a positive 1 to 1 input to output. Further, the Forced Way method produces a final output that is constant (torque or rotational speed does not vary while at a given output ratio) and continuous (no interruption of torque or rotational speed at a given output ratio). The Forced Way method is also directly driven, with no possibility of slipping and can also operate at a high output rotational speed (rpm). The Forced Way method can be used to directly "drive" the variable output or it can be used as a variable "control" in order to vary the output.

This PDIVT embodiment is a transmission that utilizes the Force Way method as a variable "control" in order to vary the output. The Forced Way method can also be utilized to function as a direct "drive" type IVT with or without mechanical "frictionless" total braking capability or as a standalone mechanical "frictionless" total braking system only. Note: As a mechanical "frictionless" total braking system there would be nothing to wear out or replace (as would be with disc or drum brakes). Also, it would NOT heat up at all under repeated or continuous heavy braking, virtually eliminating brake fade or failure, and would be unaffected by extreme ambient heat or cold.

Note: All components (not including the planetary drive set components 1-6 and Output Gear 28 and Output Shaft 25) are mirror images of each other and perform the exact same functions simultaneously. However, note that Way Follower Shaft 23 leads Way Follower Shaft 24 by 90° when simultaneously moving along their respective Way Cones and therefore perform their function (rotational speed) 90° out of phase.

Referring now to FIG. 1, and mindful that all rotations and movements are in the directions indicated only, the device features the following components:

Ring Gear 1—Ring gear as part of planetary gear set made up components 1-6.
Sun Gear 2—Sun gear as part of planetary gear set made up components 1-6.
Planet Gear 3—Planet gear as part of planetary gear set made up components 1-6.

Carrier Gear 4—Carrier gear as part of planetary gear set made up components 1-6.
Planet Gear 5—Planet gear as part of planetary gear set made up components 1-6.
Carrier Support Shaft 6—Shafts that are affixed to Carrier Gear 4 and are axels for Planet Gear 3 and Planet Gear 5 upon which Planet Gear 3 and Planet Gear 5 are allowed to freely rotate.
CV Joint 7—CV (constant velocity) joints that transfers power/torque between Way Follower Shaft 23 and Control Shaft 8. Also transfers power/torque between Way Follower Shaft 24 and Control Shaft 9.
Control Shaft 8—Shaft that transfers torque from Way Follower Shaft 23 via CV Joint 7 to Overrun Clutch 21 and visa versa.
Control Shaft 9—Shaft that transfers torque from Way Follower Shaft 24 via CV Joint 7 to Overrun Clutch 22 and visa versa.
Input Shaft 10—Shaft driven by input power source and is affixed to Input Drive Pulleys 14 and 15 and Sun Gear 2.
Way Cone 11—An open ended heavy metal cone that is affixed to a base using Way Cone Mounting Bracket 13 such that it does not move or rotate however its open larger end edge can be deformed (by some means not shown) to assume various shapes beginning as a circle, moving through various ellipse shapes, ending with a final shape of an oblong. (See FIGS. 2, 3, and 4)
Drive Cone 12—A very flexible cone that is mounted on bearings inside Way Cone 11 at their smaller tubular ends so as to allow Drive Cone 12 to rotate freely within Way Cone 11. (Note: FIG. 1 does not show bearings and counter weighting elements that will be necessary on Drive Cone 12 in order that Drive Cone 12 may rotate within Way Cone 11 with the least resistance and vibration.) Drive Cone 12, when forced to rotate, will be use to force the follower end of the Way Follower Shaft 23 to follow the "way" (edge of Way Cone 11) and therefore over whatever shape Way Cone 11 has been configured to at that time.
Way Cone Mounting Bracket 13—Brackets affixed to Way Cone 11 and Way Cone 26 which are then affixed firmly to the base indicating that Way Cone 11 and Way Cone 26 are stationary and do not rotate or move. (other then changing shape)
Input Drive Pulley 14—A cog pulley affixed to Input Shaft 10 and drives Drive Belt 18 which in turn drives Cone Drive Pulley 16.
Input Drive Pulley 15—A cog pulley affixed to Input Shaft 10 and drives Drive Belt 19 which in turn drives Cone Drive Pulley 17.
Cone Drive Pulley 16—A cog pulley that is affixed to Driver Cone 12.
Cone Drive Pulley 17—A cog pulley that is affixed to Driver Cone 27.
Drive Belt 18—A cog belt that transmits power/torque from Input Drive Pulley 14 to Cone Drive Pulley 16.
Drive Belt 19—A cog belt that transmits power/torque from Input Drive Pulley 15 to Cone Drive Pulley 17.
Control Gear 20—A gear which has two (2) overrun clutches, Overrun Clutch 21 and Overrun Clutch 22, affixed and centered on both sides. Overrun Clutch 21 accepts Control Shaft 8 from one side and Overrun Clutch 22 accepts Control Shaft 9 from its other side. Control Gear 20 meshes with Ring Gear 1.
Overrun Clutch 21—Overrun clutch that is affixed to and centered on one side of Control Gear 20 and has the same overrun rotational direction as Overrun Clutch 22.
Overrun Clutch 22—Overrun clutch that is affixed to and centered on one side of Control Gear 20 and has the same overrun rotational direction as Overrun Clutch 21.
Way Follower Shaft 23—Shaft whose one end is formed around the edge of Way Cone 11 and is fitted with roller bearings so as to be able to roll around (follow) the edge of Way Cone 11 with the least amount of resistance. Way Follower Shaft 23's opposite end is affixed to CV Joint 7.
Way Follower Shaft 24—Shaft whose one end is formed around the edge of Way Cone 26 and is fitted with roller bearings so as to be able to roll around (follow) the edge of Way Cone 26 with the least amount of resistance. Way Follower Shaft 24's opposite end is affixed to CV Joint 7.
Output Shaft 25—Final output shaft that is affixed to Output Gear 28.
Way Cone 26—An open ended heavy metal cone that is affixed to a base using Way Cone Mounting Bracket 13 such that it does not move or rotate however it's open larger end edge can be deformed (by some means not shown) to assume various shapes beginning as a circle, moving through various ellipse shapes, ending with a final shape of an oblong. (See FIGS. 2, 3, and 4)
Drive Cone 27—A very flexible cone that is mounted on bearings inside Way Cone 26 at their smaller tubular ends so as to allow Drive Cone 27 to rotate freely within Way Cone 26. (Note: FIG. 1 does not show bearings and counter weighting elements that will be necessary on Drive Cone 27 in order that Drive Cone 27 may rotate within Way Cone 26 with the least resistance and vibration.) Drive Cone 27, when forced to rotate, will be use to force the follower end of the Way Follower Shaft 24 to follow the "way" (edge of Way Cone 26) and therefore over whatever shape Way Cone 26 has been configured to at that time.
Output Gear 28—Gear that is affixed to Output Shaft 25 and meshes with Carrier Gear 4.
Way Follower Bearing 29—Ball bearings affixed at one end of Way Follower Shafts 23 and 24 such that one bearing rides along the outside surface of Way Cone 11 and 26 and the another bearing rides along the inside surface of Way Cone 11 and 26.

The PDIVT (Using the "Forced Way" method) capabilities are as follows:
1. Will not slip—Output is completely mechanically directly driven and can not slip.
2. Can handle very heavy torque loads. (Through full range of output rotational speeds.)
3. Able to run at high output rotational speeds. (Even under very heavy torque loads.)
4. Output is constant—No variation in rotational speed or torque. (Unlike ratcheting or pulsing methods that vary in rotational speed and torque in the process of developing output torque)
5. Output can be easily varied while under very heavy loads. (No frictional resistances while varying output)
6. Can also be used as a "frictionless" total braking system. Unlike any existing "positive drive" IVT the "Forced Way" method is so robust that it can handle total braking (ratio down) without damage even in very heavy vehicles like 18 wheelers. As a total braking system it can be used on any vehicle it is propelling or as a standalone total braking system alone.

The components of FIG. 1 will now be described in greater detail. Again, all rotations and movements are in the directions indicated only.
Ring Gear 1 (Control)—Ring Gear 1 is a gear that is supported by a bearing on Input Shaft 10 and rotates freely around Input Shaft 10. Ring Gear 1 is used as the variable "control" of the planetary set comprising of components 1 through 6. Depending on what RPM (revolutions per minute) Ring Gear 1 is rotating, relative to Sun Gear 2, will dictate what the input to output (Sun Gear 2 to Carrier Gear 4) ratio will be.

Sun Gear 2 (Input)—Sun Gear 2 is affixed to, and driven by, Input Shaft 10 which is driven by the input power source. Sun Gear 2 delivers input rotational speed/torque to the planetary gear set comprised of components 1 through 6.

Planet Gear 3—Planet Gear 3 along with Planet Gear 5 revolve around Sun Gear 2 and rotate around Carrier Support Shafts 6 which are affixed to Carrier Gear 4. The speed (revolutions per minute) at which Planet Gear 3 and Planet Gear 5, as a carrier, revolve around Sun Gear 2 causes Carrier Gear 4 to rotate at the same speed (RPM). Planet Gear 3 and Planet Gear 5 also mesh with Ring Gear 1. Varying Ring Gear 1's rotational speed with respect to Sun Gear 2 also varies Planet Gear 3's and Planet Gear 5's speed of revolving around Sun Gear 2 and therefore varies the RPM (revolutions per minute) of Carrier Gear 4. This is the varied output RPM (revolutions per minute) to be delivered to the driven system.

Carrier Gear 4 (Output)—Carrier Gear 4 is a gear that is supported by a bearing on Input Shaft 10 and rotates freely around Input Shaft 10. Carrier Gear 4 has affixed to it two (2) Carrier Support Shafts 6 upon which Planet Gear 3 and Planet Gear 5 are free to rotate. Carrier Gear 4 receives the final varied speed (RPM)/torque output from Planet Gear 3 and Planet Gear 5 as a carrier. Carrier Gear 4 delivers the final varied rotational speed/torque output through Output Gear 28 and then through Output Shaft 25 to the system being driven.

Planet Gear 5—Planet Gear 5 performs the same function as describe for Planet Gear 3.

Carrier Support Shaft 6—Carrier Support Shafts 6 are shafts that are affixed by their one end to Carrier Gear 4 and are the axels upon which Planet Gear 3 and Planet Gear 5 are allowed to freely rotate.

CV Joint 7—CV Joint 7 are CV (constant velocity) joints that transfers power/torque between Way Follower Shaft 23 and Control Shaft 8. Also transfers power/torque between Way Follower Shaft 24 and Control Shaft 9.

Control Shaft 8—Control Shaft 8 is a shaft whose one end is connected to CV Joint 7 and whose other end is inserted into Overrun Clutch 21 which is affixed to Control Gear 20. Control Shaft 8 may overrun Overrun Clutch 21 in the rotational direction shown for Control Shaft 8. Control Shaft 8 also rotates freely within Drive Cone 12. As Way Follower Shaft 23 is forced to follow around the edge of Way Cone 11 then Way Follower Shaft 23 will rotate at a rotational speed (RPM) dictated by Way Cone 11's shape at that time. If Way Cone 11's shape is anything other then a full circle then Way Follower Shaft 23 will vary in rotational speed (RPM) as it is forced to follow Way Cone 11 (See FIG. 3 and FIG. 4) Note: Way Follower Shaft 23 will be rotating at somewhat slower rotational speed (RPM) over Way Cone's !00° segments and with somewhat faster rotational speed (RPM) over Way Cone's 80° segments. This variation in rotational speed (RPM) of Way Follower Shaft 23 is transferred via CV Joint 7 to Control Shaft 8. Control Shaft 8, being within Overrun Clutch 21, will limit Overrun Clutch 21's, and therefore also limit Control Gear 20's, rotational speed (RPM) to a rotational speed no faster then Control Shaft 8's rotational speed (RPM). Now since Way Follower Shaft 23 leads Way Follower Shaft 24 by 90° in its position along their receptive paths (Way) (See FIGS. 3 and 4) this ensures that, at any given time, Way Follower Shaft 23 or Way Follower Shaft 24 or both will always be within the 100° segment of the Way (path) which is the slower of the rotational outputs. This means that Control Shaft 8, in conjunction with Control Shaft 9, will therefore limit Control Gear 20 to only rotate to a maximum rotational speed (RPM) no greater then the slowest rotational speed (RPM) of either Control Shaft 8 or Control Shaft 9. Note: During the times when Way Follower Shaft 23 is moving over the Way Cone's 80° segments and has a somewhat faster rotational speed (RPM) this drives Control Shaft 8 via CV Joint 7 to overrun Overrun Clutch 21 and therefore has no effect on Control Gear 20.

Control Shaft 9—Control Shaft 9 is a shaft whose one end is connected to CV Joint 7 and whose other end is inserted into Overrun Clutch 22 which is affixed to Control Gear 20. Control Shaft 9 receives its rotational speed (RPM) in the same manner as described for Control Shaft 8 however its rotational speed (RPM) is the result of the components from Control Shaft 9's side of FIG. 1. (See FIG. 1)

Input Shaft 10—Input Shaft 10 is the shaft that is force to rotate by the input power source. Input Shaft 10 is affixed to Sun Gear 2 and to Input Drive Pulley 14 and 15. Ring Gear 1 and Carrier Gear 4 are supported by bearings on Input Shaft 10 and rotate freely around Input Shaft 10. Input Shaft 10 delivers the input power/torque to Sun Gear 2 and to Input Drive Pulley 14 and 15. Input Drive Pulleys 14 and 15 then drive Drive Belts 18 and 19 which in turn drives Cone Drive Pulleys 16 and 17. Cone Drive Pulleys 16 and 17 are affixed to Drive Cone 12 and 27 respectively and are therefore then also driven. Note: Input Drive Pulley 14 and 15 are ⅓ the diameter of Cone Drive Pulleys 16 and 17. Therefore three (3) revolutions of Input Shaft 10 results in one (1) revolution of Drive Cone 12 and Drive Cone 27. Also, three (3) revolutions of Input Shaft 10 results in three (3) revolutions of Sun Gear 2.

Way Cone 11—Way Cone 11 is affixed to a stationary base by Way Cone Mounting Bracket's 13 which hold Way Cone 11 stationary. Way Cone 11's larger open end is used as a Way (path) over which Way Follower Shaft 23 is forced to follow due to the rotation of Drive Cone 12. Way Cone 11's larger open end is deformed (by some means not shown) to form a shape ranging from a circle, through various ellipse shapes, ending in an oblong shape. (See FIGS. 2, 3 and 4) The shape that Way Cone 11's open end takes dictates the Way Follower Shaft 23 speed of rotation as it is forced around Way Cone 11's edge.

Drive Cone 12—Drive Cone 12 is a very flexible cone that rotates freely within Way Cone 11. (Note: FIG. 1 does not show bearings and counter weighting elements that will be necessary on Drive Cone 12 in order that Drive Cone 12 may rotate within Way Cone 11 with the least resistance and vibration.) Input Shaft 10 drives Input Drive Pulley 14 which drives Drive Belt 18 which drives Cone Drive Pulley 16 which is affixed to Drive Cone 12 and causes it to rotate. Way Follower Shaft 23 feeds through an opening in Drive Cone 12 as it wraps around the edge of Way Cone 11. It is at this opening in Drive Cone 12 that when Drive Cone 12 is forced to rotate then Drive Cone 12 will force that end of Way Follower Shaft 23 to follow around the edge of Way Cone 11. Note: Input Drive Pulley 14 is ⅓ the diameter of Cone Drive Pulley 16. Therefore three (3) revolutions of Input Shaft 10 results in one (1) revolution of Drive Cone 12.

Way Cone Mounting Bracket 13—Way Cone Mounting Bracket 13 are brackets affixed to Way Cone 11 and Way Cone 26 which are then affixed firmly to the base indicating that Way Cone 11 and Way Cone 26 are stationary and do not rotate or move. (other then changing shape)

Input Drive Pulley 14—Input Drive Pulley 14 is a cog pulley that is affixed to Input Shaft 10 and meshes with Drive Belt 18. Input power source applies power/torque to Input Shaft 10 which drives Input Drive Pulley 14 which drives Drive Belt 18 which drives Cone Drive Pulley 16 which is affixed to Drive Cone 12 which means Drive Cone 12 is also driven. Note: Input Drive Pulley 14 is ⅓ the diameter of Cone Drive Pulley 16. Therefore three (3) revolutions of Input Shaft 10 results in one (1) revolution of Drive Cone 12.

Input Drive Pulley 15—Input Drive Pulley 15 is a cog pulley that is affixed to Input Shaft 10 and meshes with Drive Belt 19. Input power source drives Input Shaft 10 which drives Input Drive Pulley 15 which drives Drive Belt 19 which drives Cone Drive Pulley 17 which is affixed to Drive Cone 27 which means Drive Cone 27 is also driven. Note: Input Drive Pulley 15 is ⅓ the diameter of Cone Drive Pulley 17. Therefore, three (3) revolutions of Input Shaft 10 results in one (1) revolution of Drive Cone 27.

Cone Drive Pulley 16—Cone Drive Pulley 16 is affixed to Driver Cone 12 and meshes with Drive Belt 18. When Drive Belt 18 forces Cone Drive Pulley 16 to rotate then Driver Cone 12 is also forced to rotate.

Cone Drive Pulley 17—Cone Drive Pulley 17 is affixed to Driver Cone 27 and meshes with Drive Belt 19. When Drive Belt 19 forces Cone Drive Pulley 17 to rotate then Driver Cone 27 is also forced to rotate.

Drive Belt 18—Drive Belt 18 transmits power/torque from Input Drive Pulley 14 to Cone Drive Pulley 16.

Drive Belt 19—Drive Belt 19 transmits power/torque from Input Drive Pulley 15 to Cone Drive Pulley 17.

Control Gear 20—Control Gear 20 has two (2) overrun clutches, Overrun Clutch 21 and Overrun Clutch 22, affixed and centered on both sides. Control Shaft 8 is inserted into Overrun Clutch 21 from one side and Control Shaft 9 is inserted into Overrun Clutch 22 from the other side. When Ring Gear 1 attempts to force Control Gear 20 to rotate in the rotational direction indicated by arrows on Control Shaft 8 and Control Shaft 9 then the overrun clutches 21 and 22 limits Control Gear 20 to only rotate to a maximum rotational speed (RPM) no greater then the slowest rotational speed (RPM) of either Control Shaft 8 or Control Shaft 9. And since Control Gear 20 meshes with Ring Gear 1 therefore also limits Ring Gear 1's maximum rotational speed (RPM) to no greater then the slowest rotational speed (RPM) of either Control Shaft 8 or Control Shaft 9.

Overrun Clutch 21—Overrun Clutch 21 is a one-way clutch/bearing that will allow Control Shaft 8 to rotate, in the rotational direction indicated by arrow, faster than Overrun Clutch 21's rotational speed (RPM) which also prevents Overrun Clutch 21, and therefore Control Gear 20 to which it is affixed, from rotating faster then Control Shaft 8.

Overrun Clutch 22—Overrun Clutch 22 is a one-way clutch/bearing that will allow Control Shaft 9 to rotate, in the rotational direction indicated by arrow, faster than Overrun Clutch 22's rotational speed (RPM) which also prevents Overrun Clutch 22, and therefore Control Gear 20 to which it is affixed, from rotating faster then Control Shaft 9.

Way Follower Shaft 23—Way Follower Shaft 23 is a shaft whose bearing end is forced, by the rotation of Drive Cone 12, to follow around the edge of Way Cone 11 and the resultant rotational speed is then transferred by Way Follower Shaft 23's opposite end via CV Joint 7 to Control Shaft 8.

Way Follower Shaft 24—Way Follower Shaft 24 is a shaft whose bearing end is forced, by the rotation of Drive Cone 27, to follow around the edge of Way Cone 26 and the resultant rotational speed is then transferred by Way Follower Shaft 24's opposite end via CV Joint 7 to Control Shaft 9.

Output Shaft 25—Output Shaft 25 is the final output shaft and is affixed to Output Gear 28 which meshes with Carrier Gear 4. The final varied rotational speed (RPM)/torque output is developed on Carrier Gear 4 which drives Output Gear 28 and then over Output Shaft 25 to the system being driven.

Way Cone 26—Way Cone 26 is affixed to a stationary base by Way Cone Mounting Bracket's 13 which hold Way Cone 26 stationary. Way Cone 26's larger open end is used as a Way (path) over which Way Follower Shaft 24 is forced to follow due to the rotation of Drive Cone 27. Way Cone 26's larger open end is deformed (by some means not shown) to form a shape ranging from a circle, through various ellipse shapes, ending in an oblong shape. (See FIGS. 2, 3 and 4) The shape that Way Cone 26's larger open end takes dictates Way Follower Shaft 24's speed of rotation as it is forced around Way Cone 16's edge.

Drive Cone 27—Drive Cone 27 is a very flexible cone that rotates freely within Way Cone 26. (Note: FIG. 1 does not show bearings and counter weighting elements that will be necessary on Drive Cone 27 in order that Drive Cone 27 may rotate within Way Cone 26 with the least resistance and vibration.) Input Shaft 10 drives Input Drive Pulley 15 which drives Drive Belt 19 which drives Cone Drive Pulley 17 which is affixed to Drive Cone 27 and causes it to rotate. Way Follower Shaft 24 feeds through an opening in Drive Cone 27 as it wraps around the edge of Way Cone 26. It is at this opening in Drive Cone 27 that when Drive Cone 27 is forced to rotate then Drive Cone 27 will force that end of Way Follower Shaft 23 to follow around the edge of Way Cone 26. Note: Input Drive Pulley 15 is ⅓ the diameter of Cone Drive Pulley 16. Therefore, three (3) revolutions of Input Shaft 10 results in one (1) revolution of Drive Cone 27.

Output Gear 28—Output Gear 28 Gear that is affixed to Output Shaft 25 and meshes with Carrier Gear 4. The final varied rotational speed (RPM)/torque output is developed on Carrier Gear 4 which drives Output Gear 28 and then over Output Shaft 25 to the system being driven.

Way Follower Bearing 29—Way Follower Bearing 29 are ball bearings affixed at one end of Way Follower Shafts 23 and 24 that allows those ends of Way Follower Shafts 23 and 24, when force to do so by Driver Cones 12 and 27, to roll with the least amount of frictional resistance around the edge (following the Way) of Way Cones 11 and 26.

One would need to create some form of flexible path (Way) as with a band or cone that can be flexed (deformed) to achieve shapes from circular (circle) through various ellipse shapes and ending with an oblong shape. Referring to FIG. 5, the flexible path (Way) may be engineered to also utilize a shape that would be deformed past the oblong shape so as the straight portions of the oblong would curve negatively towards its center (Path D). This would then generate a path (Way) of negative rotation (reverse) RPM that could then be used to produce a negative RPM output that could be used for the reverse gear in a vehicle.

This flexible path (Way) would also need to be engineered so as to be able to withstand high torque that would attempt to deform (by twisting) the path (Way) at any given position along the 100° section (See FIGS. 3 and 4) of the path (Way), and then only over a very small portion of that section of the path (Way). These flexible bands or cones that will act as a path (Way) need to be affixed to a base so as they will not move in any way other then being able to be flexed in order to after their shape.

By using the band or cone previously described, connect one end of a shaft to the edge of the band or from the inside of the cone to the edge of the cone in such a way as to be able to force that end of the shaft to follow the shape of edge of the band or cone. The shaft rotates at the same rate that the curve of the band or cone takes. The opposite end of the shaft angles away from the edge of the band (towards the smaller end in the cone example) to a point that meets at the center line drawn perpendicular to the shape of the band or cone and also passes through the center of the shape (i.e. the circle). At that point on the center line, the shaft end is affixed to a CV (Constant Velocity) joint. Then on the opposite side of that CV joint, affix one end of a second shaft, and extend it from there along the center line which would be in a direction away from the band or the cone. Now one must make a duplicate of the embodiment previously described. Place the duplicate embodiment as to be a mirror image to the first embodiment with the bands or larger cone ends to the outside, and the second shafts to be along the center line towards each other but not connected or touching. Make a gear with a diameter equal the outside diameter of the ring gear of the planetary gear set to be described later. Affix to each side, and centered with, this gear an overrun clutch such that they may be overrun in the same rotational direction. (i.e., if a shaft was through both) Place this gear/overrun clutches between the two (2) embodiments previously described. Insert the ends of the shafts that were towards each other, but not connected or touching, into the overrun clutches on each side of the gear/overrun clutches assembly.

Devise a cog pulley affixed to each embodiment that can be driven by a cog belt so as to force the end of the shaft that is at the band or cone edge to move (follow) around the edge so as to follow and rotate with whatever shape that edge takes. These cog pulleys will be driven (via cog belt) by the cog pulleys that are affixed to the input drive shaft that will be describe in the following.

Make or obtain a planetary gear set whose planetary gears are directly across from and equal in diameter to the sun gear, and whose ring gear is three (3) times the diameter of the sun gear. Affix a drive shaft to and through the center and perpendicular to the sun gear. Also affix to that drive shaft two (2) cog pulleys, one (1) on either side of the planetary gear set, whose cog pulley diameters are equal to ⅓ the diameter of the cog pulleys. This forces the shaft end to follow around the band or cone shape so that three (3) revolutions of the input drive shaft will cause the end of the shaft following around the band or cone shape to make one complete trip around the band or cone shape. (i.e., 3 to 1 ratio) Place the planetary gear set such that the ring gear aligns with and meshes with the gear/overrun clutches that is located in the middle of the two (2) embodiments. At this time the cog gears on the drive shaft should line up with the cog gears that drive the shafts around the band or cone. Place cog belts from drive shaft cog gears to the cog gears that drive the shaft ends around the band or cone shape (edges). Affix a gear on the planetary gears of the planetary gear set to in order to obtain the rotational output from the carrier. Referring FIG. 5, engineer a method so as to be able to deform the two (2) bands or Two (2) cones, whichever are used, simultaneously and equally from that of a circle (Path A), through continuously changing ellipse shapes (path B±) to the final shape of an oblong (Path C).

In this embodiment there would be needed some type of dampening system to ease the torque shock that would result after the input RPM/torque was removed and even possibly applied negatively to the load as when letting off the gas of the vehicle and then reapplying the input RPM/torque (i.e., again stepping on the gas).

Referring again to FIG. 1, also note that when the final output rotational speed (rpm) of Output Shaft 25 is at the highest ratio (3 to 1 of input to output) the Way Cone 11 and 26 are in an oblong shape and the Way Follower Shaft 23 and 24 are at a 0 rotational speed (rpm) holding Control Gear 20 and therefore Ring Gear 1 to a 0 rpm. The system could be designed such that while under these conditions (that of running at the highest output ratio) the ring gear 1 could be locked up or braked and simultaneously the Input Drive Pulley 14 and 15 could be disengaged, thereby preventing rotation of Input Drive Pulley 14 and 15, Drive Belt 18 and 19, Cone Drive Pulley 16 and 17, and Drive Cone 12 and 27, which would greatly increase the life of the transmission.

Using this embodiment (i.e. "cone" Way and "cone" drive), if an electric motor were to be the power source, then instead of using the electric motor to apply input power to Input Shaft 10, the electric motor/motors could be mounted on Drive Cones 12 and 27 next to Cone Drive Pulleys 16 and 17 and to the base, and would drive Drive Cones 12 and 27 and Cone Drive Pulleys 16 and 17 directly instead of externally.

Alternate Embodiments of the Invention

One reason this FIG. 1 embodiment was selected was to more clearly show the movement of the Way Follower Shafts 23 and 24; however, a much smaller configuration could be used that would perform the identical function. To describe the smaller configuration, and still referring to FIG. 1, start with the embodiment as it is now and eliminate everything except Follower Shafts 23 and 24, CV Joint 7, and Control Shafts 8 and 9. Now imagine the Way Follower Shafts 23 and 24 (bearing ends) following heavy metal bands shaped as if you sawed off the very end (say 6 inches wide) of the original cones. Now we have just the two (2) 6-inch wide heavy metal bands, Way Follower Shafts 23 and 24, CV Joint 7 and Control Shafts 8 and 9 as mirror images of each other (except Shaft 23 leads Shaft 24 by 90° in its position on its band) along a center line. Now, along the center line, move Way Follower Shaft 24, and its metal band (Way), along with CV Joint 7 and Control Shaft 9 to the left until both CV Joints 7 are directly aligned with (in the middle of) the other's metal band. In this configuration note that the Way Follower Shafts 23 and 24 can be forced to follow their respective bands without touching (colliding) because Shaft 23 is always leading Shaft 24 by 90°. This makes this configuration approximately ½ (one-half) the size of the "cone" Way/"cone" Drive embodiment; however, it can still be engineered to perform an identical function.

As stated in the Summary of the Invention section, the "Forced Way" method can also be used to directly drive the system to be driven with a positively driven variable ratio output (instead of being the "control" in a planetary gear set). Referring again to FIG. 1, this can be done, using this "cone" Way/"cone" Drive embodiment as an example, by eliminating components 1-6, 25, 28, 20, 21, and 22. Continue by taking the outputs from Control Shaft 8 and 9 and isolating (selecting) only their outputs from the 100° segments of their bands by some method of engagement and disengagement of clutches, and then tying those outputs to a third and single output. Since one or the other or both of the outputs will always be from the 100° segments then the third (single) output would always be that with the rotational speed dictated by the curve of the path (Way) of the 100° segments at that time, and would also be constant (without any interruption in speed (RPM) or torque) and continuous (no variations in speed (RPM) or torque during the chosen output ratio). Thus, varying (changing) the shape of the path (Way) varies the outputs rotational speed. Referring now to FIG. 5, using the "Forced Way" method to directly vary the output ratios, ratios can range from a small negative RPM (reverse) (See path D) through to a 0 RPM (stationary) (See path C) on through continuously variable ratios (See path B±) ending with a 1 to 1 input to output ratio. (Full speed) (See path A)

The FIG. 1 embodiment could be reconfigured by using a differential drive in place of the planetary gear set (components 2, 3, 4 and 5) which may or may not be a better engineering choice due to wear or frictional considerations. Also, when using the differential drive configuration the final output (RPM) would be equal to the input (RPM), i.e. 1 to 1 ratio, instead of a 3 to 1 input-to-output ratio as is the case with this planetary configuration.

The FIG. 1 embodiment could also be reconfigured such that Way Follower Shafts 23 and 24 would be affixed to their respective Drive Cones 12 and 27 so as to eliminate the need to follow Way Cones 11 and 26 using Way Follower Bearing 29 in order to cause rotation of Way Follower Shafts 23 and 24. Way Follower Shafts 23 and 24 would be forced to rotate with the shape of Drive Cones 12 and 27 as it rotates and is forced to follow the configured shape of Way Cones 11 and 26.

Also, FIG. 1 does not show bearings and counter weighting elements that will be necessary on Drive Cone 12 and 27 in order that Drive Cone 12 and 27 may rotate within Way Cone 11 and 26 with the least resistance and vibration.

Referring again to FIG. 1, the following is a description of how the FIG. 1 components work and interact with one another to produce the desired results. Again, all rotations and movements are in the directions indicated only.

First, relating only to the planetary gear "set" consisting of components 1-6 the following will describe how, by using the "Forced Way" method by directly connected mechanical means, to vary Ring Gear 1's RPM relative to Sun Gear 2's input RPM and therefore vary Carrier Gear 4's final output RPM.

Input power/torque is applied to Input Shaft 10 causing rotation in the rotational direction shown by arrows. Input Shaft 10 then applies said rotational speed (RPM)/torque simultaneously to Sun Gear 2 and Input Drive Pulleys 14 and 15. Input Drive Pulleys 14 and 15 drive Drive Belts 18 and 19 which drives Cone Drive Pulleys 16 and 17 causing Drive Cones 12 and 27 to rotate simultaneously and at the same RPM, within Way Cones 11 and 26, and in the rotational direction indicated by arrows. Note that Drive Cones 12 and 27 rotate at ⅓ the RPM of Input Shaft 10 and Sun Gear 2 due to Input Drive Pulleys 14 and 15 being ⅓ the diameter of Cone Drive Pulleys 16 and 17. The rotation of Drive Cones 12 and 27 forces Way Follower Shafts 23 and 24, at their bearing ends, to follow the shape of Way Cones 11 and 26 at their larger open ends. Way Cones 11 and 26's larger open end are deformed by some means (not shown) to produce shapes ranging from that of a full circle, continuing through various ellipse shapes, and ending in the shape of an oblong. (See FIGS. 2, 3 and 4) Note: When Way Cones 11 and 26's larger open ends are deformed they are deformed at the same time and to the same degree. (i.e., equally) If Way Cones 11 and 26's shape is that of a circle then Way Follower Shafts 23 and 24, when forced by Drive Cones 12 and 27 to follow Way Cone 11s and 26, will do so at a constant RPM equal to that of Drive Cones 12 and 27. If Way Cones 11 and 26's shape is anything other then a full circle then Way Follower Shafts 23 and 24's RPM will vary as they are forced to follow Way Cones 11 and 26 (See FIGS. 3 and 4). Way Follower Shafts 23 and 24 will be rotating at somewhat slower RPM over Way Cone's 100° segments (greater radius of arc) and with somewhat faster RPM over Way Cone's 80° segments (Smaller radius of arc). This variation in RPM of Way Follower Shafts 23 and 24 is transferred via CV Joint 7 to Control Shafts 8 and 9. Control Shafts 8 and 9, being within Overrun Clutches 21 and 22, will limit Overrun Clutches 21 and 22's RPM, and therefore also limit Control Gear 20's RPM, (if attempting to rotate faster then Control Shafts 8 or 9's RPM) to an RPM no faster then Control Shafts 8 or 9's RPM (whichever is the slowest) because Overrun Clutches 21 and 22, and therefore also Control Gear 20, can not overrun Control Shafts 8 or 9.

Now since Way Follower Shaft 23 leads Way Follower Shaft 24 by 90° in its position while traveling along their receptive paths (Way) (See FIGS. 3 and 4) this ensures that, at any given time, Way Follower Shaft 23 or Way Follower Shaft 24 or both will always be within the 100° segment of the either Way (path) which is the slower of the rotational outputs. This means that Control Shaft 8, in conjunction with Control Shaft 9, will therefore limit Control Gear 20 to only rotate to a maximum RPM no greater then the slowest RPM of either Control Shaft 8 or Control Shaft 9. Note: During the times when Way Follower Shaft 23 or 24 is moving over the Way Cone's 80° segments and has a somewhat faster RPM this drives Control Shaft 8 or 9 via CV Joint 7 to overrun Overrun Clutch 21 or 22 which can be done with no effect on Control Gear 20.

Now we see that Control Shaft 8 and 9's slowest RPM can be varied, while positively engaged, by controlling the shape of Way Cones 11 and 26. When Way Cones 11 and 26 are in the shape of a circle, then Control Shafts 8 and 9 and Control Gear 20's RPM are equal that of Drive Cones 12 and 27 which is ⅓ that of Input Drive Pulleys 14 and 15 and Sun Gear 2. If Control Gear 20 is allowed rotate in the same direction indicated by Control Shafts 8 and 9 at ⅓'d the RPM of Sun Gear 2 this will also allow Ring Gear 1, which meshes with Control Gear 20, to rotate at one third the RPM of Sun Gear 2 but in the opposite direction of Sun Gear 2. When this is the case, then the movement of Planet Gears 3 and 5 will rotate around Carrier Support Shafts 6 but not revolve around Sun Gear 2; therefore, Carrier Gear 4 (Output) is stationary and at 0 RPM. Note that when there is an input torque applied by Sun Gear 2, any resistance to rotate (load) by Carrier Gear 4 will attempt to increase Ring Gear 1's RPM and its attempts to increase Control Gear 20's RPM. It is the varying of Control Gear 20's allowable RPM that controls and varies the output RPM of Carrier Gear 4. As Way Cones 11 and 26 are slowly deformed, the 100° segment arcs take on a greater and greater radius of arc and therefore slow the allowable RPM of Control Gear 20. As Control Gear 20's allowable RPM is forced (with no possibility of slipping) to continuously decrease, Carrier Gear 4's RPM is forced (with no possibility of slipping) to continuously increase. When Way Cones 11 and 26's shape is deformed to the point to where Cones 11 and 26's shape reaches that of an oblong, then the 100° segment are no longer an arc but a straight line (See FIG. 4) and therefore Control Gear 20's allowable RPM is 0 (zero) which forces Ring Gear 1's RPM to be 0 (zero) which forces Carrier Gear 4's output RPM to be at the maximum of one third that of Sun Gear 2's output RPM.

SUMMARY

The "Forced Way" method generates a continuous infinitely variable output while directly and mechanically connected to the input and can not slip. My Forced Way method utilized in the PDIVT (Positive Drive Infinitely Variable Transmission) embodiment is the IVT that everyone has been looking for. My PDIVT can deliver an infinitely variable output ranging from a neutral or 0 rpm when standing still to a maximum of a 1 to 1 input-to-output ratio and all while continuously and directly connected to the input. These outputs are continuously variable while positively driven and, due to its robust design, can withstand very high torque with no possibility of slipping. Outputs can not slip because they are mechanically directly connected. My PDIVT also meets all other criteria needed to be practical for manufacture and use.

A method and apparatus for carrying out the method are as follows: One end of a shaft is forced to follow a continuous path around a closed loop at a constant speed. The path is defined by a rotatable and deformable structure. The deformable structure may be deformed by deforming a surrounding stationary structure called a "way". After one complete circuit, the shaft has rotated by one revolution. The path may start out as a circle, but it can be controllably deformed into curves of varying radii that would range from the radius of the given circle to that of the various radii (arcs) of various ovals to a shape of an oblong, where a portion of the path has an infinitely large radius, i.e., is a straight line segment. Forcing the end of the shaft to follow these paths results in the shaft rotating at different rotational speeds as it transverses the path. By sampling only the rotational output while moving over the desired portion or segment of the path, one can control the output's rotational speed which will be some ratio of the input. The path may even be shaped as a "dogbone" in which a portion of the path has a negative radius, thereby providing an output that is in a direction that is the reverse of the direction resulting from a positive radius for the path segment. (However please note: various methods can be used to force the path end of said output shaft to follow said path (way) and therefore any particular means is not "absolutely necessary" for development of infinitely variable output ratios achieved using the Forced Way method).

The "sampling" may be accomplished by providing a second set of shaft and way components, with the second shaft arranged about 90 degrees out of phase, either leading or lagging, the first shaft. The ends of the shafts opposite the ends attached to the ways are connected to an overrun clutch, or a coordinated pair of such clutches. The overrun clutch(es) is designed such that its output is controlled by the lesser (or more negative) of the rotational speeds of the inputs, i.e., the two shafts.

INDUSTRIAL APPLICABILITY

The "Forced Way" method of varying the input to output ratio uses none of the components found in any continuously variable transmission in existence to date. The "Forced Way" method has NO cams, pins, variable sprockets, ratchets or ratcheting (incrementing) systems, or fluids (hydrostatic). The "Forced Way" method is directly driven and can not slip yet simpler and less costly then the high pressure, special lubricant, friction driven continuously variable transmissions in use today.

Given the nature of this invention it would probably be used in the automotive industry in the development of their power trains and propulsion systems for automobiles, trucks, buses, etc. The auto manufactures would use the PDIVT (i.e. "Forced Way" concept) in order to increase the efficiency of the ICE (Internal Combustion Engine) propelled vehicles and possibly in their electric motor propelled vehicles.

The auto manufactures may also use the "Forced Way" method in the development of a "frictionless" total braking system to be used in their vehicles to completely replace/eliminate the frictional braking systems used today. Note: As a "frictionless" total braking system there is nothing to wear out with a need to replace, would NOT heat up at all under continuous or repeated heavy braking virtually eliminating brake fade or failure and would be unaffected by extreme ambient heat or cold.

The "Forced Way" method could also be used in industry anywhere variable speed control would be needed, for instance, for use on conveyer belt lines, assembly lines, etc.

The artisan of ordinary skill will appreciate that various modifications may be made to the invention herein described without departing from the scope or spirit of the invention as defined in the appended claims.

What is claimed is:

1. An apparatus for infinitely varying the output rotational speed of an output shaft as a ratio of the input rotational speed, comprising:
   (a) a pair of deformable structures;
   (b) a pair of overrun clutches;
   (c) a pair of way follower shafts,
   (d) wherein one end of each way follower shaft is attached to a deformable structure, and the other end terminates in and drives one of said pair of overrun clutches;
   (e) wherein a rotational input rotates each of said deformable structures in the same direction and at the same RPM, thereby causing said way follower shafts to traverse a path that comes back on itself to form a closed loop, and wherein a complete circuit around said path comprises one rotation of said way follower shaft;
   (f) means for controllably deforming a shape of said deformable structures at the same time and to the same extent, thereby changing the radius of the path at different points along the path;
   (g) wherein one way follower shaft leads the other way follower shaft by ninety degrees; and
   (h) wherein said pair of overrun clutches are arranged with respect to each other and with respect to each of said way follower shafts such that a rotational output from said pair of overrun clutches is the slower of the rotational speed of each way follower shaft.

2. The apparatus of claim 1, wherein said deformable structures comprise a flexible cone.

3. The apparatus of claim 1, wherein each of said deformable structures is driven by at least one of a gear and a pulley.

4. The apparatus of claim 1, further comprising a CV joint located at some point along a length of said way follower shaft.

5. The apparatus of claim 1, wherein said way follower shaft is connected to a control shaft located within one of said overrun clutches.

6. The apparatus of claim 1, further comprising an output gear driven by an output of said overrun clutches.

7. The apparatus of claim 6, wherein said output gear drives an output shaft through a planetary gear system.

8. A method for reducing the output rotational speed relative to the input relative speed in a transmission, comprising:
   (a) providing a transmission of the type described in claim 1: and
   (b) controllably deforming each of said deformable structures in such a manner as to increase a radius of the path at at least one point on said path, and as to reduce said radius at at least one other point on said path.

9. The method of claim 8, wherein said controllably deforming is performed to an extent whereby at at least one point along said path, said path has an infinitely large radius.

10. The method of claim 8, wherein said controllably deforming is performed to an extent whereby at least one point along said path has a negative radius, thereby causing a direction of said output rotation to be the negative of said input rotation direction.

11. A method for reducing the output rotational speed relative to the input relative speed in a transmission, comprising:

(a) providing a transmission comprising:
  (i) a pair of structures circular in shape that can be deformed to an oblong shape or slightly beyond and still return to the original circular shape;
  (ii) a pair of way follower shafts,
  (iii) means for attaching one end of each way follower shaft to said deformable structure such that the attached end of said way follower shaft is able to freely move (roll, slide etc.) along said path (way) while forced to maintaining the same tangential (same orientation) position with the said path,
  (iv) means to couple the other end (the free end) of said way follower shaft with one (1) end of a control shaft in such a way that rotation can be imparted one to the other when said way follower and control shafts are not in alignment;
  (v) means for supporting said way follower shafts, said deformable structures and said control shafts;
  (vi) wherein a rotational input rotates each of said structures in the same direction and at the same RPM, thereby causing each of said way follower shafts to traverse a path that comes back on itself to form a closed loop, and wherein a complete circuit around said path comprises one rotation of said way follower shaft, further wherein one way follower shaft leads the other way follower shaft by ninety degrees; and
  (vii) means for controllably deforming said path;
(b) adding a quantity of energy to force the end of said way follower shaft that is attached to said structure, to follow said path, thereby causing said way follower shaft and coupled control shaft to rotate and with a rotational speed that is a percentage of the input rotational speed as dictated by the radius of arc, i.e. curve, of said path; and
(c) controllably deforming each of said structures in such a manner as to increase a radius of the path at at least one point on said path, and as to reduce said radius at at least one other point on said path.

12. The method of claim 11, wherein said force is applied to induce movement in the path end of said way follower shaft to follow the said path (way).

13. The method of claim 12, wherein said force is supplied by a source of energy that causes the rotation of a flexible cone that is positioned within the said path (way) and to which the path end of said way follower shaft is affixed.

14. The method of claim 12, wherein said force causing the rotation of said flexible cone is derived from the input source of energy (torque) and delivered to the said flexible cone via cog belt and pulleys.

15. An apparatus for infinitely varying the output rotational speed of a control shaft as a ratio of the input rotational speed, comprising:
  (a) a driven system comprising a set of two (2) way follower shafts;
  (b) a strong yet flexible set of two paths that can be deformed from a circular shape to an oblong shape and slightly beyond and back to the circular shape without damage or permanent deformation;
  (c) a means for simultaneously and to the same extent deforming the two said flexible paths to any of the infinite number of shapes from a circular shape to an oblong shape and slightly beyond;
  (d) means for attaching one end of each of said way follower shaft to each of said path (way) such that the attached end of said way follower shaft is able to freely move (roll, slide etc.) along said path while forced to maintaining the same tangential (same orientation) position with the said path, and wherein one way follower shaft leads the other way follower shaft by 90 degrees;
  (e) means to couple the other ends (the free ends) of said way follower shafts with one (1) end of a control shaft in such a way that rotation can be imparted one to the other when said way follower and control shafts are not in co-axial alignment; and
  (f) an assembly comprising a means for supporting said way follower and control shafts and said paths.

16. The apparatus of claim 15, wherein said flexible paths comprise heavy metal cones conical in shape whose larger open ends are deformable from a circular shape to an oblong shape and slightly beyond and back to a circular shape but are also fixed to a base and can not move other than being deformed.

17. The apparatus of claim 15, wherein said means for coupling the other ends comprises a CV (constant velocity) joint.

18. The apparatus of claim 15, further comprising very flexible, yet having strong torque rigidity, metal cones (conical shape) that when forced to rotate about a central axis will force the ends of said way follower shafts to follow said path (way)/s.

19. The apparatus of claim 15, further comprising a pair of overrun clutches each connected to one of said two control shafts, the overrun clutches co-operating with respect to each other such that their rotational output is the smaller of the rotational velocities of the two control shafts.

\* \* \* \* \*